US009329712B2

(12) United States Patent
Miyake

(10) Patent No.: US 9,329,712 B2
(45) Date of Patent: May 3, 2016

(54) ELECTRONIC DEVICE HAVING CHANGEABLE TOUCH RECEIVING REGION

(75) Inventor: Takashi Miyake, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 35 days.

(21) Appl. No.: 13/982,242

(22) PCT Filed: Jan. 27, 2012

(86) PCT No.: PCT/JP2012/000535
§ 371 (c)(1),
(2), (4) Date: Jul. 26, 2013

(87) PCT Pub. No.: WO2012/102055
PCT Pub. Date: Aug. 2, 2012

(65) Prior Publication Data
US 2013/0314356 A1     Nov. 28, 2013

(30) Foreign Application Priority Data

Jan. 27, 2011  (JP) .................................. 2011-015689
Apr. 25, 2011  (JP) .................................. 2011-097182

(51) Int. Cl.
*G06F 3/01*     (2006.01)
*G06F 3/041*    (2006.01)
*G06F 3/0488*   (2013.01)

(52) U.S. Cl.
CPC ............... *G06F 3/041* (2013.01); *G06F 3/016* (2013.01); *G06F 3/0414* (2013.01); *G06F 3/0416* (2013.01); *G06F 3/0488* (2013.01)

(58) Field of Classification Search
CPC .................. G06F 3/041–3/047; G06F 3/0414; G06F 3/0416; G06F 3/0488
See application file for complete search history.

(56) References Cited

U.S. PATENT DOCUMENTS

| 2006/0161870 A1* | 7/2006 | Hotelling et al. ............. 715/863 |
| 2007/0057926 A1* | 3/2007 | Ohzawa et al. ............... 345/173 |
| 2007/0097151 A1* | 5/2007 | Rosenberg .................... 345/660 |
| 2011/0050588 A1* | 3/2011 | Li et al. ........................ 345/173 |

(Continued)

FOREIGN PATENT DOCUMENTS

| JP | 03-070020 A   | 3/1991 |
| JP | 08-063289 A   | 3/1996 |
| JP | 2001-109557 A | 4/2001 |
| JP | 2008-021094 A | 1/2008 |
| JP | 2010-134625 A | 6/2010 |

OTHER PUBLICATIONS

International Search Report; PCT/JP2012/000535; May 1, 2012.

*Primary Examiner* — Larry Sternbane
(74) *Attorney, Agent, or Firm* — Studebaker & Brackett PC

(57) ABSTRACT

An electronic device (1) prevents unintended operations when a contact position shifts, by having a display unit (20) that displays an object, a contact detection unit (10) that detects contact by a contacting body, a pressure detection unit (30) that detects pressure on the detection unit (10), and a control unit (60) that performs processing associated with the object displayed on the display unit (20) in accordance with a contact position of the contacting body in a region of the detection unit (10) corresponding to an receiving region of the object and with data based on pressure on the detection unit (10) acquired from the pressure detection unit (30), such that when the contact position of the contacting body changes as the data based on pressure increases, the control unit (60) changes the receiving region of the object in a direction of change of the contact position.

4 Claims, 7 Drawing Sheets

(56) References Cited

U.S. PATENT DOCUMENTS

| | | | |
|---|---|---|---|
| 2011/0057886 A1* | 3/2011 | Ng et al. | 345/173 |
| 2013/0127765 A1* | 5/2013 | Behdasht et al. | 345/173 |
| 2015/0009424 A1* | 1/2015 | Fujita | G06F 3/045 349/12 |
| 2015/0242008 A1* | 8/2015 | Beckman | G06F 3/043 345/177 |

* cited by examiner

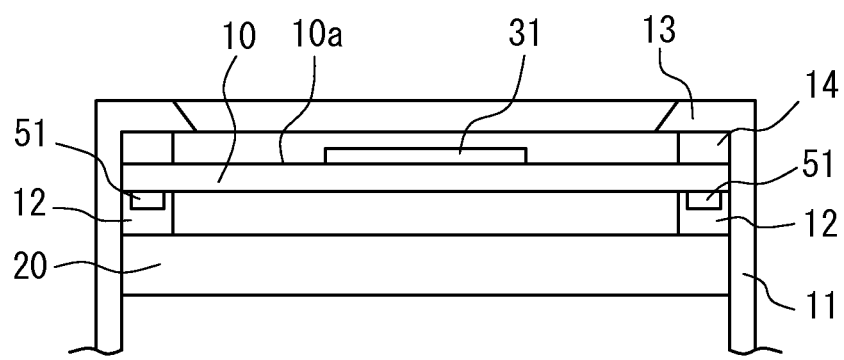
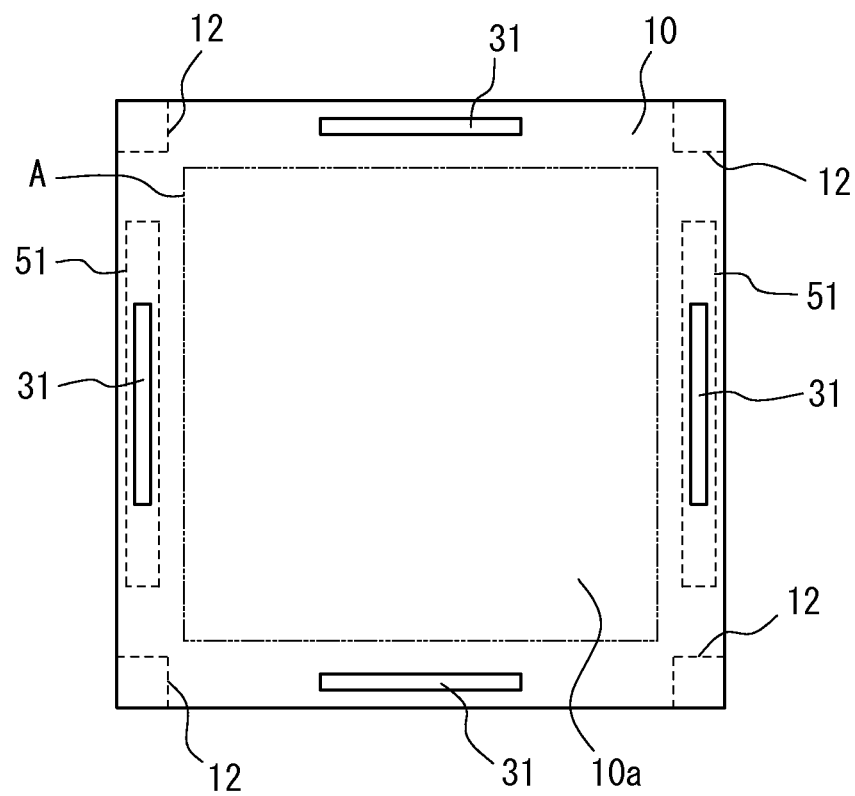

ELECTRONIC DEVICE HAVING CHANGEABLE TOUCH RECEIVING REGION

CROSS-REFERENCE TO RELATED APPLICATIONS

This application claims priority to and the benefit of Japanese Patent Application No. 2011-015689 filed Jan. 27, 2011, and of Japanese Patent Application No. 2011-097182 filed Apr. 25, 2011 the entire contents of which are incorporated herein by reference.

FIELD

The present invention relates to an electronic device provided with a contact detection unit.

BACKGROUND

In recent years, among mobile terminals such as cellular phones, electronic devices are increasingly provided with a contact detection unit, such as a touch sensor or touch switch, as a member for detecting an operation by the operator. Electronic devices provided with a contact detection unit are in wide use apart from mobile terminals as well, in devices such as calculators or ticket vending machines, household appliances such as microwave ovens, televisions, or lighting appliances, industrial devices (factory automation equipment), and the like.

A variety of types of such contact detection units are known, including a resistive film type and a capacitive type. All of these types of contact detection units detect contact by the operator's finger, a stylus pen, or the like. Typically, an electronic device provided with a contact detection unit displays an image (hereinafter referred to as an "object") of an operation key, a button, or the like (hereinafter referred to simply as "operation key or the like") on the display screen of a display unit provided on the rear face of the contact detection unit. When the operator presses an object displayed on the display screen, the contact detection unit is configured to detect contact at the position of the press.

By controlling the size of the input display image based on the contact area of the operator's finger with the contact detection unit and on the pressure load, known electronic devices prevent a determination that two or more input areas are being pressed simultaneously even when the operator has a large fingertip (large contact area) and avoid input error even when an inexperienced operator performs input operations (for example, Patent Literature 1). Other electronic devices resolve erroneous input operations, such as misalignment or multiple input that are characteristic for each operator, by adjusting the allowable input area individually for each operator (for example, see Patent Literature 1 and 2).

Furthermore, to prevent processing by the electronic device from being performed when the contact detection unit is simply brushed lightly with a finger, while also providing an operator with a real tactile sensation, as when pressing an actual button, upon the operator pressing an object, an electronic device has been proposed to receive input when a pressure load satisfying a predetermined input receiving standard is applied to the contact detection unit and to provide a predetermined tactile sensation to the operator's fingertip, for example by vibrating the contact detection unit. Hereinafter, such an electronic device is referred to as an "electronic device having a tactile sensation providing function".

CITATION LIST

Patent Literature

1: JP3070020A
2: JP8063289A

When the operator presses an object, such as an operation key or the like, displayed on the display unit, an electronic device determines that an object has been pressed at the instant the operator contacts the object. Therefore, if the contact position first contacted by the operator is within the area of an object, the processing associated with the object starts. On the other hand, with an electronic device having a tactile sensation providing function, in order to provide a real tactile sensation, an object is not determined to have been pressed upon the operator simply contacting the contact detection unit, but rather is determined to have been pressed when a pressure load is subsequently applied. In this case, if the operator applies strong pressure so as to press down on the pressed location, the contact position of the finger with the contact detection unit moves from the fingertip to the finger pad, thus causing a shift in the contact position.

FIGS. 7A, 7B and 7C illustrate a shift in contact position in an electronic device. Typically, as illustrated in FIG. 7A, an electronic device determines a contact position P at the instant the operator contacts a contact detection unit 10 with a finger and determines that the object corresponding to the contact position P has been pressed. In the case of an electronic device having a tactile sensation providing function, however, the only determination for the contact position P that is first contacted is whether the contact position P corresponds to the position of an object. Subsequently, it is determined that the object has been pressed if a pressure load is applied so as actually to press the object down. When a person forcibly presses a flat surface with a finger, pressure is applied to the finger pad, so that the shape of the finger changes from the shape depicted by the dashed line to that depicted by the solid line in FIG. 7B. As a result, the contact position moves from the fingertip to the finger pad, from P to P'. The contact position is, for example, the position of the median point of the pressed area for a resistive film type and is the central position of the area contacted in the contact detection unit for a capacitive type.

As illustrated in FIG. 7C, even if the contact position P is within an receiving region A at first, the contact position may shift upon the application of a pressure load, and the shifted contact position P' may end up outside of the receiving region A.

As illustrated in FIG. 7C, when the operator applies a pressure load to the contact detection unit 10 in order to press a region A of the contact detection unit corresponding to a receiving region of an object (hereinafter simply refer to as "receiving region"), and the shifted contact position P' is outside of the receiving region A, the electronic device determines that pressing of the object has been interrupted. Moreover, if another object is located very close to the object being pressed, it may be determined that the object close by has been pressed due to the shift in contact position.

With the techniques disclosed in Patent Literature 1 and 2, the size of the display image or of the allowable input area is adjusted at the time at which the operator presses the object, and therefore these techniques cannot adjust for the shift in contact position caused by the start of application of a pressure load. Furthermore, in the case of an electronic device having a tactile sensation providing function, a shift in position occurs regardless of finger size. The techniques disclosed in Patent Literature 1 and 2, however, cannot perform adjustment to increase the display image or the allowable input area for an operator with a slender finger (small contact area).

In this way, when the contact position shifts due to the operator applying pressure, a conventional electronic device cannot prevent operations not intended by the operator, such as interruption of pressing of an object or pressing of a nearby object.

The present invention has been conceived in light of these circumstances, and it is an object thereof to provide an electronic device that can prevent operations not intended by the operator when the contact position shifts due to the operator applying pressure.

SUMMARY

In order to achieve the above matters, an electronic device according to the present invention includes: a display unit configured to display an object; a contact detection unit configured to detect contact by a contacting body; a pressure detection unit configured to detect pressure on the contact detection unit; and a control unit configured to perform processing associated with the object displayed on the display unit in accordance with a contact position of the contacting body in a region of the contact detection unit corresponding to a receiving region of the object and in accordance with data based on pressure on the contact detection unit acquired from the pressure detection unit, such that when the contact position of the contacting body detected by the contact detection unit changes as the data based on pressure increases, the control unit changes the receiving region of the object in a direction of change of the contact position.

Furthermore, in the electronic device according to the present invention, the control unit may change the receiving region of the object in accordance with the direction of change of the contact position detected by the contact detection unit and with one of an amount of change of the contact position and the data based on pressure.

Furthermore, in the electronic device according to the present invention, the control unit may dynamically change the receiving region of the object.

Furthermore, in the electronic device according to the present invention, the control unit may perform at least one of expanding and moving the receiving region of the object.

According to the present invention, it is possible to provide an electronic device that can prevent operations not intended by the operator when the contact position shifts due to application of pressure.

BRIEF DESCRIPTION OF DRAWINGS

The present invention will be further described below with reference to the accompanying drawings, wherein:

FIGS. 2A and 2B illustrate an exemplary housing structure of the electronic device according to an embodiment 1 of the present invention;

DESCRIPTION OF EMBODIMENTS

The following describes embodiments of the present invention in detail with reference to the drawings.

Embodiment 1

Figure 1:
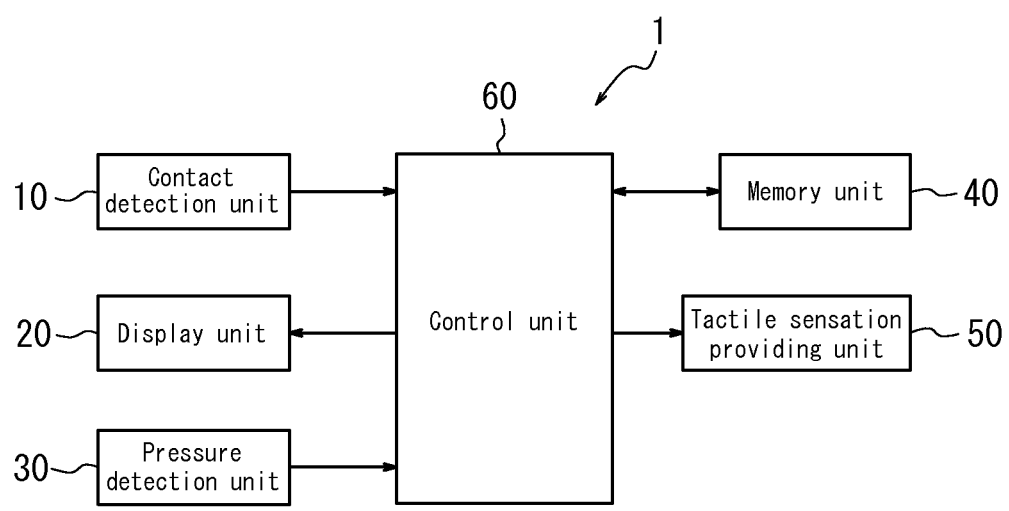
FIG. 1 is a block diagram schematically illustrating the configuration of an electronic device according to an embodiment of the present invention.

FIG. 1 is a block diagram schematically illustrating the configuration of an electronic device according to Embodiment 1 of the present invention. As illustrated in FIG. 1, the electronic device 1 is provided with a contact detection unit 10, a display unit 20, a pressure detection unit 30, a memory unit 40, a tactile sensation providing unit 50, and a control unit 60.

The display unit 20 displays an image of an object, such as a push button switch (push-type button switch). A push button switch is a button, key, or the like with which the operator performs an input operation. The display unit 20 is, for example, configured using a liquid crystal display panel (LCD), an organic EL display panel, or the like.

The contact detection unit 10 is normally provided on the front face of the display unit 20 and detects, on a corresponding touch face 10a of the contact detection unit 10, contact by a contacting body (pressing body), such as the operator's finger, with an object displayed on the display unit 20, or detects release of contact. The contact detection unit 10 detects the contact position on the touch face 10a and notifies the control unit 60 of the detected contact position. The contact detection unit 10 is of such a type as a resistive film type, capacitive type, or the like.

The pressure detection unit 30 detects pressure on the touch face 10a of the contact detection unit 10 and is, for example, configured using a strain gauge sensor, an element such as a piezoelectric element, or the like that experiences a change in physical or electrical characteristics (strain, resistance, voltage, or the like) in response to pressure. When the pressure detection unit 30 is configured using a piezoelectric element, for example, the magnitude of the voltage (voltage value), which is an electrical characteristic, of the piezoelectric element changes in accordance with the magnitude of the load (force) of the pressure on the touch face 10a of the contact detection unit 10 (or the speed at which the magnitude of the load (force) changes (acceleration)). The pressure detection unit 30 notifies the control unit 60 of the magnitude of the voltage (voltage value, hereinafter referred to simply as data). The control unit 60 acquires the data by the pressure detection unit 30 notifying the control unit 60 of the data, or by the control unit 60 detecting data relating to the piezoelectric element in the pressure detection unit 30. The control unit 60 thus acquires data based on pressure on the touch face 10a of the contact detection unit 10. In other words, the control unit 60 acquires data based on pressure from the pressure detection unit 30.

The memory unit 40 can be composed of a memory, stores a variety of input information, programs for causing the electronic device 1 to operate, and the like, and also functions as work memory. In the present embodiment, for example, the memory unit 40 stores a predetermined threshold related to a predetermined standard for performing processing (predetermined processing) associated with an object, and stores a receiving region corresponding to each object.

The control unit 60 starts the predetermined processing associated with an object displayed on the display unit 20 based on a contact position of the contacting body in a region of the contact detection unit 10 corresponding to the receiving region of the object. The control unit 60 instructs the tactile sensation providing unit 50 to perform a tactile sensation providing operation when data based on pressure acquired from the pressure detection unit 30 satisfies a predetermined standard, i.e. when the data based on pressure exceeds a predetermined threshold stored in the memory unit 40.

When the contact position of the contacting body detected by the contact detection unit 10 changes as the data based on pressure acquired from the pressure detection unit 30 increases, the control unit 60 changes (for example, expands or moves) the receiving region of the object in the direction of change of the contact position. Note that even when changing the receiving region, the control unit 60 preferably does not change the region of the object displayed on the display unit 20, so as not to affect the design of the user interface (UI) already being displayed.

The tactile sensation providing unit 50 is, for example, configured using a piezoelectric element or the like and provides a predetermined tactile sensation to the contacting body in contact with the touch face 10*a* by generating vibration or the like in a predetermined vibration pattern. With the tactile sensation providing unit 50, it is possible to notify the operator as to whether data based on pressure satisfies a predetermined standard.

FIGS. 2A and 2B illustrates an exemplary housing structure of the electronic device 1 illustrated in FIG. 1. FIG. 2A is a cross-sectional diagram of some portions, and FIG. 2B is a plan view of some portions. The display unit 20 is contained in a housing 11. The contact detection unit 10 is held on the display unit 20 via insulators 12 made of elastic members. Note that the display unit 20 and the contact detection unit 10 in the electronic device 1 according to the present embodiment are illustrated as rectangles in plan view. In the present embodiment, the contact detection unit 10 is held on the display unit 20 via the insulators 12 arranged at four corners outside a display area A of the display unit 20 illustrated by a phantom line in FIG. 2B.

The housing 11 is provided with an upper cover 13 covering a surface area of the contact detection unit 10 outside the display area of the display unit 20, and an insulator 14 made from an elastic member is provided between the upper cover 13 and the contact detection unit 10.

The contact detection unit 10 illustrated in FIGS. 2A and 2B has a surface member, configured for example using a transparent film or glass, and has a rear face member configured using glass or acryl. The surface member includes the touch face 10*a*. The contact detection unit 10 is structured so that when the touch face 10*a* is pressed, the pressed part bends (strains) slightly in response to the pressing force, or the entire structure bends slightly.

A strain gauge sensor 31 for detecting a load (pressing force) on the contact detection unit 10 is provided, by attachment or the like, on the surface of the contact detection unit 10 near each side thereof at a position covered by the upper cover 13. Furthermore, piezoelectric elements 51 for vibrating the contact detection unit 10 are provided, by attachment or the like, on the rear face of the contact detection unit 10 near two opposing sides thereof. In other words, in the electronic device 1 illustrated in FIGS. 2A and 2B, the pressure detection unit 30 illustrated in FIG. 1 is configured using four strain gauge sensors 31, and the tactile sensation providing unit 50 is configured using two piezoelectric elements 51. The tactile sensation providing unit 50 vibrates the contact detection unit 10 in order to cause the touch face 10*a* to vibrate. Note that in FIG. 2B, the housing 11, upper cover 13, and insulator 14 illustrated in FIG. 2A are omitted.

Figure 3:
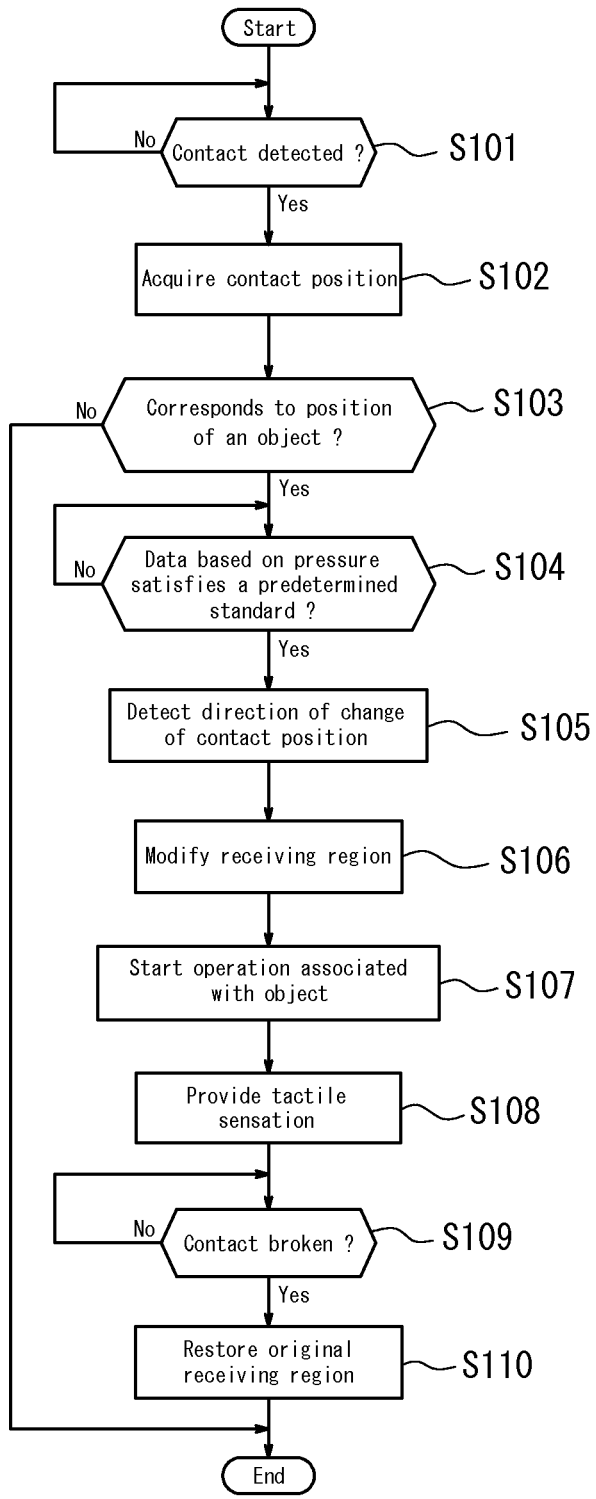
FIG. 3 is a flowchart of operations by the electronic device according to an embodiment of the present invention.

Next, operations of the electronic device 1 with the above configuration according to the present embodiment are described. FIG. 3 is a flowchart of operations by the electronic device 1 according to the present embodiment.

First, when operations of the electronic device 1 start, the control unit 60 monitors for contact on the contact detection unit 10 (step S101). When contact on the contact detection unit 10 by a contacting body such as the operator's finger is detected in step S101, the control unit 60 acquires the contact position from the contact detection unit 10 (step S102).

The control unit 60 determines whether the contact position acquired in step S102 corresponds to a position at which the image of an object, such as a key, is displayed (step S103). If the contact position does not correspond to a position at which the image of an object is displayed, processing terminates. On the other hand, if the contact position corresponds to a position at which the image of an object is displayed, the control unit 60 periodically acquires data based on pressure from the pressure detection unit 30 and waits until the acquired data based on pressure reaches a predetermined standard, i.e. until the acquired data based on pressure exceeds a predetermined threshold stored in the memory unit 40 (step S104). The predetermined threshold is a value corresponding to the load (force) of the minimum necessary pressure when the operator presses down on the contact detection unit 10.

Figure 4:
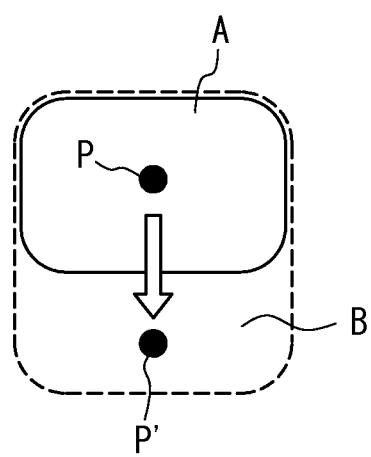
FIG. 4 illustrates operations by the electronic device according to an embodiment of the present invention.
Figure 7A:
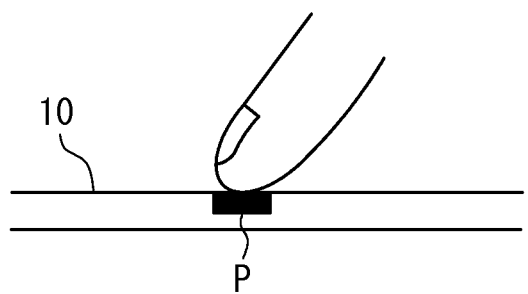
FIGS. 7A, 7B and 7C illustrate a shift in contact position in an electronic device.
Figure 7B:
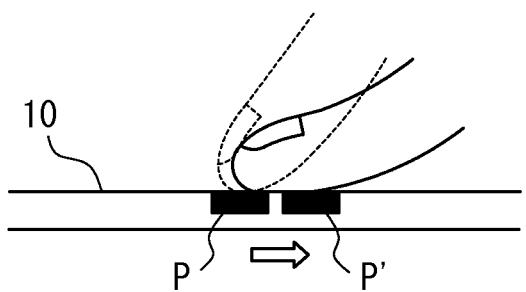
Figure 7C:
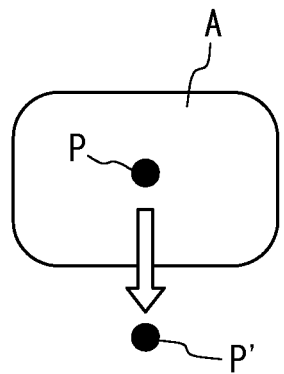

FIG. 4 illustrates processing by the control unit 60 of Embodiment 1 to modify the receiving region. FIG. 4 depicts the contact position P moving to contact position P' due to an increase in pressing force, with the contact position P' being located outside of the receiving region A. As was illustrated in FIG. 7C, when the contact position is located outside of the receiving region A, a conventional electronic device judges that the operator has released his finger from the object, or when there exists another object corresponding to the contact position P', judges that the other object has been pressed. In order to prevent such operations not intended by the operator, the control unit 60 in the present embodiment determines that the object corresponding to the receiving region A is being pressed for as long as the operator continues to apply pressure, even when the contact position P' is located outside of the receiving region A.

In other words, the control unit 60 detects the direction of change of the contact position (direction of the vector component from the contact position P towards the contact position P') (step S105) and changes (for example, expands or moves) the receiving region A of the object to an receiving region B in the acquired direction of change of the contact position (step S106). As a result, as long as the contact position P' is located within the receiving region B, processing can be performed as though the object corresponding to the receiving region A were pressed.

The control unit 60 can determine the receiving region B by expanding the receiving region A in the direction of change of the contact position by a predetermined ratio. For example, the control unit 60 can determine the receiving region B by expanding the receiving region A in the direction of change of the contact position by a ratio corresponding to the amount of change of the contact position. Furthermore, the control unit 60 may determine the receiving region B by expanding the receiving region A in the direction of change of the contact position by a ratio corresponding to data based on pressure acquired by the pressure detection unit 30.

The control unit 60 can also determine the receiving region B by moving the receiving region A in the direction of change of the contact position by a predetermined amount of movement. For example, the control unit 60 can determine the receiving region B by moving the receiving region A in the direction of change of the contact position by an amount of movement corresponding to the amount of movement of the contact position. Furthermore, the control unit 60 may determine the receiving region B by moving the receiving region A in the direction of change of the contact position by an amount of movement corresponding to data based on pressure acquired from the pressure detection unit 30.

The control unit 60 then considers that the object corresponding to the receiving region A has been pressed and starts processing associated with the object (step S107). The control unit 60 also instructs the tactile sensation providing unit 50 to perform a tactile sensation providing operation (step S108).

Subsequently, the control unit 60 waits until the finger breaks contact (i.e. the finger becomes separated from the contact detection unit 10) (step S109). Upon determining that the finger has broken contact, the control unit 60 restores the receiving region B to the original receiving region A (step S110), and processing terminates.

In this way, according to the electronic device 1 of Embodiment 1, when the contact position of the contacting body detected by the contact detection unit 10 changes as the data based on pressure acquired from the pressure detection unit 30 increases, the control unit 60 expands or moves the receiving region A of the object in the direction of change of the contact position. As a result, when the contact position shifts due to the start of application of pressure, it is possible to prevent operations not intended by the operator, such as interruption of pressing of an object or pressing of a nearby object.

Embodiment 2

Figure 5:
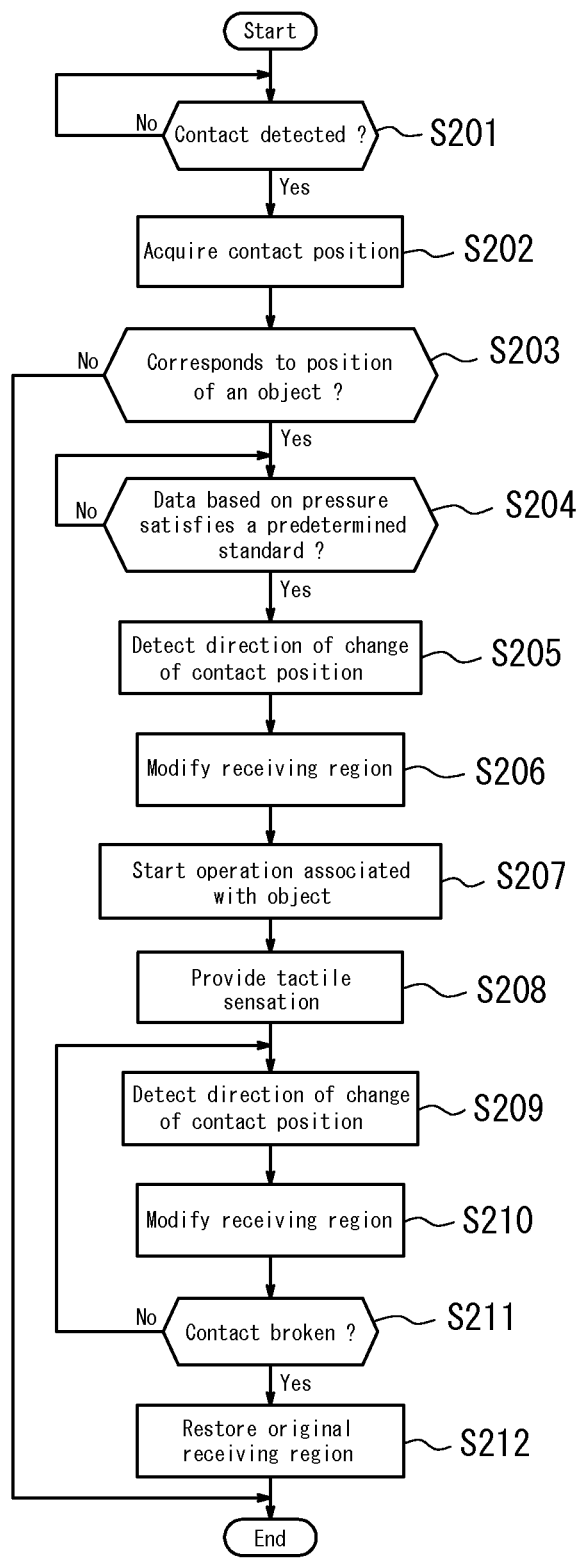
FIG. 5 is a flowchart of operations by an electronic device according to another embodiment of the present invention.

Next, an electronic device according to Embodiment 2 of the present invention is described. An electronic device 1 according to Embodiment 2 has the same constituent elements as the electronic device 1 according to Embodiment 1 and differs only in the processing by the control unit 60 to adjust the receiving region. Accordingly, a description of the configuration of the electronic device 1 according to Embodiment 2 is omitted, and operations are described below. FIG. 5 is a flowchart of operations by the electronic device 1 according to the present embodiment.

When operations of the electronic device 1 start, the control unit 60 monitors for contact on the contact detection unit 10 (step S201). When contact on the contact detection unit 10 by a contacting body such as the operator's finger is detected in step S201, the control unit 60 acquires the contact position from the contact detection unit 10 (step S202).

The control unit 60 determines whether the contact position acquired in step S202 corresponds to a position at which the image of an object, such as a key, is displayed (step S203). If the contact position does not correspond to a position at which the image of an object is displayed, processing terminates. On the other hand, if the contact position corresponds to a position at which the image of an object is displayed, the control unit 60 periodically acquires data based on pressure from the pressure detection unit 30 and waits until the acquired data based on pressure reaches a predetermined standard, i.e. until the acquired data based on pressure exceeds a predetermined threshold stored in the memory unit 40 (step S204).

As in Embodiment 1 (see FIG. 4), even when the contact position P' is located outside of the receiving region A due to application of a pressure load, it is necessary to judge that the object corresponding to the receiving region A is being pressed for as long as the operator continues to apply pressure. Therefore, the control unit 60 detects the direction of change of the contact position (direction of vector component from the contact position P towards the contact position P') (step S205) and changes (for example, expands or moves) the receiving region A of the object to an receiving region B in the detected direction of change of the contact position (step S206). As a result, as long as the contact position P' is located within the receiving region B, processing can be performed as though the object corresponding to the receiving region A were pressed.

The control unit 60 determines the receiving region B by expanding the receiving region A in the direction of change of the contact position by a ratio corresponding to data based on pressure acquired from the pressure detection unit 30 or by expanding the receiving region A in the direction of change of the contact position by a ratio corresponding to the amount of change of the contact position.

The control unit 60 may also determine the receiving region B by moving the receiving region A in the direction of change of the contact position by an amount of movement corresponding to data based on pressure acquired from the pressure detection unit 30 or by moving the receiving region A in the direction of change of the contact position by an amount of movement corresponding to the amount of change of the contact position.

The control unit 60 considers that the object corresponding to the receiving region A has been pressed and starts processing associated with the object (step S207). The control unit 60 also instructs the tactile sensation providing unit 50 to perform a tactile sensation providing operation (step S208).

Figure 6:
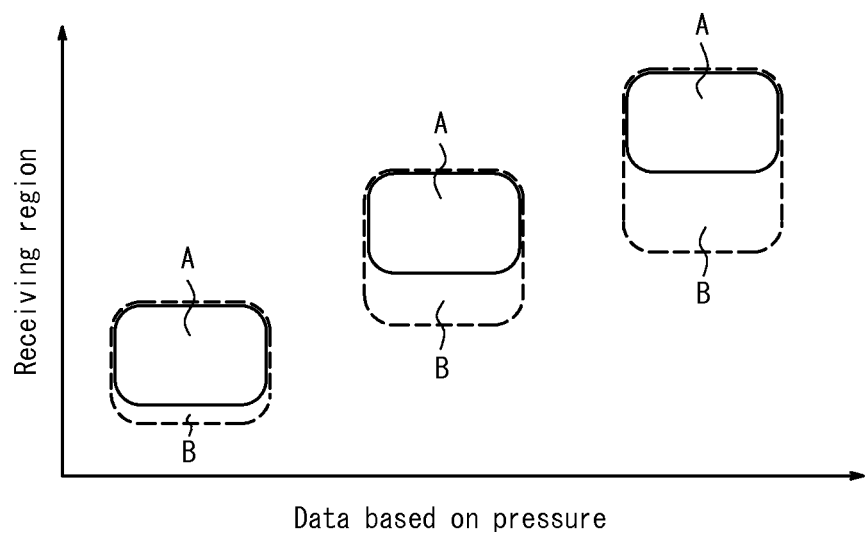
FIG. 6 illustrates operations by the electronic device according to another embodiment of the present invention.

It takes some time for an operator to release his finger after being provided a tactile sensation, and the time varies between individuals. Furthermore, some applications perform predetermined processing upon a long press of an object. Due to such pressure after provision of a tactile sensation, the contact position may shift even more, causing operations the operator did not intend. Therefore, even after providing a tactile sensation, the electronic device 1 of the present embodiment continues to modify the receiving region dynamically. FIG. 6 illustrates processing by the control unit 60 of Embodiment 2 to modify the receiving region. As illustrated in the figure, the modified area of the receiving region B is dynamically expanded at a ratio corresponding to data based on pressure, so that the area of the receiving region B increases as the data based on pressure increases. The modified area of the receiving region B may also be expanded at a ratio corresponding to the amount of change of the contact position, so that the area of the receiving region B increases as the amount of change with respect to the original contact position of the object increases.

The modified receiving region B may also be dynamically moved by an amount of movement corresponding to data based on pressure, so that the amount of movement of the receiving region B from the receiving region A increases as the data based on pressure increases. Furthermore, the modified receiving region B may be moved by an amount of movement corresponding to the amount of change of the contact position, so that the amount of movement of the receiving region B increases as the amount of movement with respect to the original contact position of the object increases.

In other words, even after providing the tactile sensation in step S208, the control unit 60 continues to detect the direction of change of the contact position (step S209) and to expand or move the receiving region A of the object to the receiving region B in the detected direction of change of the contact position (step S210).

The control unit 60 continues to perform the processing in step S209 and step S210 until the finger breaks contact with the contact detection unit 10 (i.e. the finger becomes separated from the contact detection unit 10) (step S211). Therefore, the area of the receiving region B or the amount of movement of the receiving region B from the receiving region A changes dynamically. Upon determining that the finger has broken contact, the control unit 60 restores the receiving region B to the original receiving region A (step S212), and processing terminates.

In this way, according to the electronic device 1 of Embodiment 2, after provision of a tactile sensation (performance of processing associated with an object) and until the finger breaks contact, the control unit 60 dynamically expands or moves the receiving region A of the object in the direction of change of the contact position when the contact position of the contacting body detected by the contact detection unit 10 changes. Therefore, even if the contact position shifts further due to pressure after provision of a tactile sensation, operations the operator did not intend can be prevented.

Furthermore, according to the electronic device 1 of Embodiment 2, the control unit 60 expands or moves the receiving region A of the object dynamically, and therefore the ratio of expansion or the amount of movement of the receiving region A decreases when the data based on pressure or the amount of change of the contact position is small. As a result, the receiving region A is not expanded or moved more than necessary, thereby reducing to a minimum the effect on operations such as pressing a plurality of objects simultaneously.

Note that the present invention is not limited to the above embodiments, and a variety of modifications and changes are possible. For example, in the above embodiments, the contact detection unit 10 is used to detect contact on the touch face 10a, but alternatively a load sensor (pressure detection unit) may be used to determine that contact has been made when a predetermined standard is satisfied. Like the pressure detection unit 30 in the above embodiments, such a pressure detection unit can be configured using any number of strain gauge sensors 31 or the like.

Note that in the above embodiments, the contacting body (pressing body) has been described as a finger, but the contacting body may also be a stylus pen.

Furthermore, in the above embodiments, the pressure detection unit 30 can be configured in accordance with the contact detection type. For example, in the case of a resistive film type, a configuration without a strain gauge sensor 31 may be adopted by associating the magnitude of the resistance that corresponds to the size of the contact area with the load (force) of the pressure on the touch face 10a of the contact detection unit 10. Alternatively, in the case of a capacitive type, a configuration without a strain gauge sensor 31 may be adopted by associating the magnitude of the capacitance with the load (force) of the pressure on the touch face 10a of the contact detection unit 10.

The tactile sensation providing unit 50 can also be configured to vibrate the touch face 10a of the contact detection unit 10 indirectly by causing the electronic device 1 to vibrate based on a vibration motor (eccentric motor). Furthermore, when the pressure detection unit 30 and the tactile sensation providing unit 50 are both configured using a piezoelectric element, the pressure detection unit 30 and the tactile sensation providing unit 50 can be configured to share the same piezoelectric element. The reason is that a piezoelectric element generates an electric charge when pressure is applied and deforms upon application of an electric charge.

The above embodiments have been described assuming a configuration in which the contact detection unit 10 is layered on the upper surface of the display unit 20, yet such a configuration is not required. A configuration in which the contact detection unit 10 and the display unit 20 are separated may be adopted.

In the above embodiments, the control unit 60 performs predetermined processing upon acquiring, from the pressure detection unit 30, data based on pressure satisfying a predetermined standard. Satisfying a predetermined standard may refer to data based on pressure acquired from the pressure detection unit 30 reaching a predetermined threshold, to data based on pressure acquired from the pressure detection unit 30 exceeding a predetermined threshold, or to acquisition from the pressure detection unit 30 of data based on pressure equivalent to a predetermined threshold. Furthermore, in the explanation of the above embodiments, the meaning of expressions such as "exceeding" a threshold, or being "equal to or less than" a threshold, may not be necessarily precise. "Exceeding" a threshold may include the case of being equal to or greater than the threshold, and being "equal to or less than" a threshold may include the case of being less than the threshold.

In the above embodiments, the tactile sensation providing unit 50 provides a tactile sensation to the contacting body in contact with the touch face 10a by generating a vibration in the touch face 10a, but the present invention is not limited to this approach for the tactile sensation providing unit 50 to provide a tactile sensation to the contacting body in contact with the touch face 10a. A tactile sensation may be provided to the contacting body in contact with the touch face 10a without using mechanical vibration, for example by controlling the charge of a film attached to the contact detection unit 10.

Furthermore, the contact detection unit 10 and the display unit 20 in the above embodiments may be configured as an integrated device, for example by providing a common substrate with the functions of both the contact detection unit 10 and the display unit 20. An example of such a device integrating the functions of both the contact detection unit 10 and the display unit 20 is a liquid crystal panel having a matrix of pixel electrodes, with a plurality of photoelectric conversion elements, such as photodiodes, regularly mixed therein. This device is contacted by a pen for touch input at a desired position on the panel display, and while displaying images with the liquid crystal panel structure, the device can detect the contact position by light from a backlight for liquid crystal display being reflected by the tip of the pen and received by surrounding photoelectric conversion elements.

In the above embodiments, when the contact position of the contacting body detected by the contact detection unit 10 changes as the data based on pressure acquired from the pressure detection unit 30 increases, the control unit 60 expands or moves the receiving region of the object in the direction of change of the contact position. The direction in which the receiving region of the object is expanded is not, however, limited only to the direction in which the contact position of the contacting body changes. The receiving region of the object may also be expanded in a direction other than the direction in which the contact position changes, as long as the direction in which the contact position changes is included. However, when the receiving region of the object is also expanded in a direction other than the direction in which the contact position changes, the change in the receiving region affects the receiving region of other objects and negatively impacts operations by the operator such as a multi-touch. Therefore, the direction in which the receiving region of the object is expanded may be restricted only to the direction in which the contact position of the contacting body changes.

In the above embodiments, when the contact position of the contacting body detected by the contact detection unit 10 changes as the data based on pressure acquired from the pressure detection unit 30 increases, the control unit 60 expands or moves the receiving region of the object in the direction of change of the contact position. The present invention is not, however, limited to this approach. When the contact position of the contacting body detected by the contact detection unit 10 changes as the data based on pressure acquired from the pressure detection unit 30 increases, the control unit 60 may move the receiving region of the object while expanding the receiving region in the direction of change of the contact position.

In the above embodiments, the control unit 60 expands or moves the receiving region of the object in accordance with the direction of change of the contact position detected by the contact detection unit 10 and with data based on pressure acquired from the pressure detection unit 30 or the amount of change of the contact position detected by the contact detection unit 10. The present invention is not, however, limited to this approach. The control unit 60 may move the receiving region of the object while expanding the receiving region in accordance with the direction of change of the contact position detected by the contact detection unit 10 and with data based on pressure acquired from the pressure detection unit 30 or the amount of change of the contact position detected by the contact detection unit 10.

REFERENCE SIGNS LIST

1: Electronic device
10: Contact detection unit
10*a*: Touch face
11: Housing
12: Insulator
13: Upper cover
14: Insulator
20: Display unit
30: Pressure detection unit
31: Strain gauge sensor
40: Memory unit
50: Tactile sensation providing unit
51: Piezoelectric element
60: Control unit

The invention claimed is:

1. An electronic device comprising:
a display unit configured to display an object;
a contact detection unit configured to detect contact by a contacting body;
a pressure detection unit configured to detect pressure on the contact detection unit; and
a control unit configured to perform processing associated with the object displayed on the display unit in accordance with a contact position of the contacting body in a region of the contact detection unit corresponding to a receiving region of the object and in accordance with data based on pressure on the contact detection unit acquired from the pressure detection unit, wherein
when the contact position of the contacting body detected by the contact detection unit changes as the data based on pressure increases, the control unit changes the receiving region of the object mainly in a direction of change of the contact position.

2. The electronic device according to claim 1, wherein the control unit changes the receiving region of the object in accordance with the direction of change of the contact position detected by the contact detection unit and with one of an amount of change of the contact position and the data based on pressure.

3. The electronic device according to claim 1, wherein the control unit dynamically changes the receiving region of the object.

4. The electronic device according to claim 1, wherein the control unit performs at least one of expanding and moving the receiving region of the object.

* * * * *